UNITED STATES PATENT OFFICE.

BAPTIST REUTER, OF HÖCHST-ON-THE-MAIN, GERMANY, ASSIGNOR TO THE FARBWERKE, VORM. MEISTER, LUCIUS & BRÜNING, OF SAME PLACE.

ACID CAMPHORATE OF PHENYLDIMETHYLPYRAZOLON AND PROCESS OF MAKING SAME.

SPECIFICATION forming part of Letters Patent No. 674,686, dated May 21, 1901.

Application filed November 24, 1900. Serial No 37,559. (Specimens.)

*To all whom it may concern:*

Be it known that I, BAPTIST REUTER, Ph. D., a citizen of the Empire of Germany, residing in Höchst-on-the-Main, Germany, have invented certain new and useful Improvements in the Manufacture of an Acid Camphorate of Phenyldimethylpyrazolon, of which the following is a specification.

I have found that by the action of one molecular proportion of camphoric acid on one molecular proportion of phenyldimethylpyrazolon an acid camphorate of this base may be obtained, which possesses valuable therapeutic properties.

The acid camphorate of phenyldimethylpyrazolon possesses antipyretic and antihydrotic properties, just as its components. The antihydrotic action, however, is much stronger than was to be expected from its contents of camphoric acid, while the toxic action of phenyldimethylpyrazolon is greatly reduced.

To manufacture the acid camphorate of phenyldimethylpyrazolon, I proceed as follows:

Example: One hundred and eighty-eight kilos of phenyldimethylpyrazolon and two hundred kilos of camphoric acid are converted into the acid salt in the manner described in Examples I and II of my application of the same date herewith concerning a neutral camphorate of phenyldimethylpyrazolon.

The acid camphorate of phenyldimethylpyrazolon is a white crystalline powder having a melting-point of about 95° to 98° centigrade. It is readily soluble in hot water, alcohol, and dilute acids and soluble with difficulty in ether, benzene, and ligroin.

The acid camphorate of phenyldimethylpyrazolon is intended for internal use as a medicine in the form of powders, lozenges, and solutions in doses of from 0.7 to one gram for adults. It is characterized by its valuable antipyretic and antihydrotic properties, just as its components. The antipyretic and antihydrotic action of the new compound, however, is much stronger than was to be expected from its contents of camphoric acid. While phenyldimethylpyrazolon has the disadvantage of causing a great secretion of perspiration, the new compound does not have this effect, but has an equally good antipyretic action.

Having now described my invention, what I claim is—

1. The herein-described process of making a compound of phenyldimethylpyrazolon with camphoric acid, which consists in causing one molecular proportion of phenyldimethylpyrazolon to act on one molecular proportion of camphoric acid, substantially as set forth.

2. As a new product, the acid camphorate of phenyldimethylpyrazolon, being white crystals of a melting-point 95° to 98° centigrade, readily soluble in hot water, alcohol and dilute acids, soluble with difficulty in ether, benzene and ligroin and having antipyretic and antihydrotic properties, substantially as set forth.

In testimony that I claim the foregoing as my invention I have signed my name in presence of two subscribing witnesses.

BAPTIST REUTER.

Witnesses:
 ALFRED BRISBOIS,
 BERNHARD LEYDECKER.